(12) United States Patent
Wall et al.

(10) Patent No.: US 10,310,268 B2
(45) Date of Patent: Jun. 4, 2019

(54) WAVEGUIDES WITH PERIPHERAL SIDE GEOMETRIES TO RECYCLE LIGHT

(71) Applicant: Microsoft Technology Licensing, LLC, Redmond, WA (US)

(72) Inventors: R. Andrew Wall, Kirkland, WA (US); Dmitry Reshidko, Tucson, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/370,897

(22) Filed: Dec. 6, 2016

(65) Prior Publication Data

US 2018/0157042 A1 Jun. 7, 2018

(51) Int. Cl.
| | |
|---|---|
| *G02B 27/01* | (2006.01) |
| *G02B 27/00* | (2006.01) |
| *F21V 8/00* | (2006.01) |
| *G02B 27/14* | (2006.01) |

(52) U.S. Cl.
CPC ......... *G02B 27/0172* (2013.01); *G02B 6/002* (2013.01); *G02B 27/0081* (2013.01); *G02B 6/0035* (2013.01); *G02B 2027/0125* (2013.01); *G02B 2027/0178* (2013.01)

(58) Field of Classification Search
CPC .................................................. G02B 27/0176
USPC ......................................................... 359/633
See application file for complete search history.

(56) References Cited

U.S. PATENT DOCUMENTS

| | | | |
|---|---|---|---|
| 5,943,171 | A | 8/1999 | Budd et al. |
| 5,949,583 | A | 9/1999 | Rallison et al. |
| 6,144,439 | A | 11/2000 | Carollo |
| 6,563,992 | B1 | 5/2003 | Doyle |
| 6,785,447 | B2 | 8/2004 | Yoshimura et al. |

(Continued)

FOREIGN PATENT DOCUMENTS

| | | |
|---|---|---|
| WO | 2004068182 A2 | 8/2004 |
| WO | 2006054056 A1 | 5/2006 |

(Continued)

OTHER PUBLICATIONS

Gong, et al., "A Chamfered-Edge-Pumped Planar Waveguide Solid-State Laser", In Journal of Laser Physics Letters, vol. 5, Issue 7, Jul. 2008, 1 page.

(Continued)

*Primary Examiner* — James C. Jones
(74) *Attorney, Agent, or Firm* — Arent Fox LLP

(57) ABSTRACT

An apparatus, for use in replicating an image associated with an input-pupil to an output-pupil, comprises an optical waveguide including a bulk-substrate, an input-coupler and an output-coupler. The bulk-substrate includes first and second major sides and peripheral sides. The input-coupler couples, into the waveguide, light corresponding to the image associated with the input-pupil. The output-coupler couples, out of the waveguide, light corresponding to the image that has traveled through the waveguide from the input-coupler to the output-coupler at least in part by way of TIR. At least one of the peripheral sides includes first and second surfaces that define first and second planes angled 45 degrees relative to one another. Such a peripheral side provides for effective recycling of light that would otherwise leak out of the waveguide through the peripheral side.

21 Claims, 8 Drawing Sheets

(56) References Cited

U.S. PATENT DOCUMENTS

| | | |
|---|---|---|
| 7,750,763 B2 | 7/2010 | Praßmayer et al. |
| 8,472,119 B1 | 6/2013 | Kelly |
| 9,069,115 B2 | 6/2015 | Gupta et al. |
| 2005/0174641 A1 | 8/2005 | Greenberg et al. |
| 2012/0200937 A1 | 8/2012 | Totani et al. |
| 2012/0206817 A1* | 8/2012 | Totani ................ G02B 27/0172 359/633 |
| 2014/0111865 A1 | 4/2014 | Kobayashi |
| 2015/0109822 A1 | 4/2015 | Ouderkirk |
| 2015/0219899 A1 | 8/2015 | Mack et al. |
| 2015/0235467 A1 | 8/2015 | Schowengerdt et al. |

FOREIGN PATENT DOCUMENTS

| | | |
|---|---|---|
| WO | 2012066798 A1 | 5/2012 |
| WO | 2016006758 A1 | 1/2016 |

OTHER PUBLICATIONS

"International Search Report and Written Opinion Issued in PCT Application No. PCT/US2017/064102", dated Apr. 19, 2018, 15 Pages.

* cited by examiner

WAVEGUIDES WITH PERIPHERAL SIDE GEOMETRIES TO RECYCLE LIGHT

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Apparatuses, methods and systems that recycle light that may otherwise be coupled out of a peripheral side of an optical waveguide are described herein. Certain such embodiments relate to an apparatus for use in replicating an image associated with an input-pupil to an output-pupil. Such an apparatus comprises an optical waveguide including a bulk-substrate, an input-coupler and an output-coupler. The bulk-substrate of the optical waveguide includes a first major side, a second major side opposite the first major side, and peripheral sides that can extend between the first and second major sides. The input-coupler of the optical waveguide is configured to couple, into the bulk-substrate of the optical waveguide, light corresponding to the image associated with the input-pupil. The output-coupler of the optical waveguide is configured to couple, out of the bulk-substrate of the optical waveguide, light corresponding to the image that has traveled through the optical waveguide from the input-coupler to the output-coupler at least in part by way of total internal reflection (TIR). At least one of the peripheral sides of the bulk-substrate of the optical waveguide includes first and second surfaces that define first and second planes angled 45 degrees relative to one another. Such a peripheral side provides for effective recycling of light that may otherwise undesirably leak out of optical waveguide through the peripheral side.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
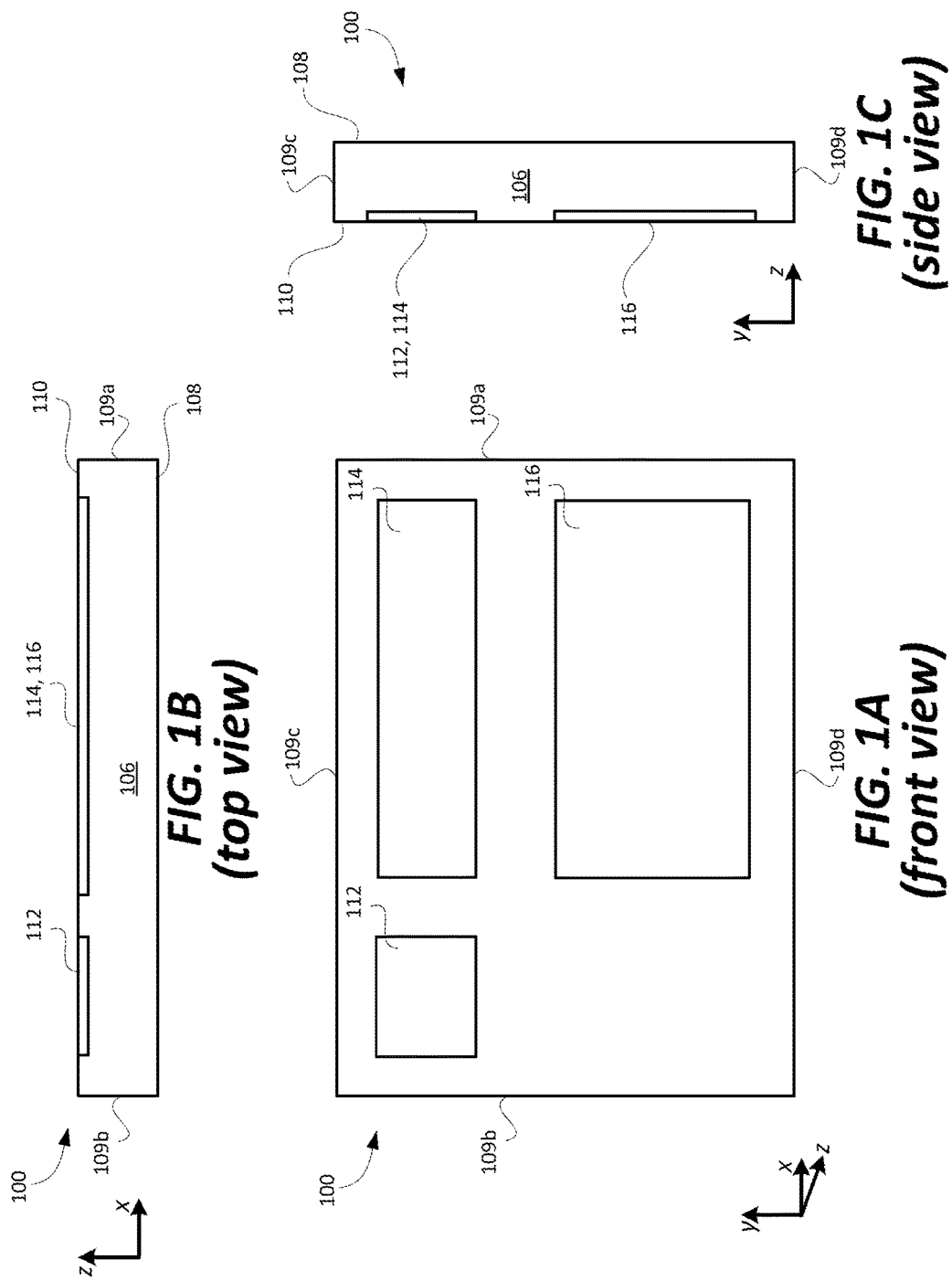
FIGS. 1A, 1B and 1C are front, top and side views, respectively, of an exemplary waveguide that can be used to replicate an image associated with an input-pupil to an expanded output-pupil.

Certain embodiments of the present technology relate to apparatuses for use in replicating an image associated with an input-pupil to an output-pupil. Such apparatuses can include a waveguide. As will be discussed in further details below, where waveguides are used to perform pupil replication (also referred to as image replication), light may inadvertently and undesirably leak out of the waveguide through one or peripheral sides of the waveguide. This may degrade the optical efficiency of the waveguide and may cause undesirable stray light in a system that includes the waveguide. Certain embodiments described herein can be used to reduce and preferably prevent light from inadvertently and undesirably leaking out of an optical waveguide through its peripheral sides, and thereby, can be used to improve the optical efficiency of the waveguide and reduce and preferably prevent stray light within a system that includes the waveguide.

In the description that follows, like numerals or reference designators will be used to refer to like parts or elements throughout. In addition, the first digit of a three digit reference number identifies the drawing in which the reference number first appears.

FIGS. 1A, 1B and 1C are front, top and side views, respectively, of an exemplary optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine.

Referring to FIGS. 1A, 1B and 10, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and viewable from the output-pupil.

The bulk-substrate 106, which can be made of glass or optical plastic, but is not limited thereto, includes a first major side 108, a second major side 110, and peripheral sides 109a, 109b, 109c and 109d. The first major side 108 and the second major side 110 are opposite and parallel to one another. In accordance with certain embodiments, the major sides 108 and 110 are planar. In accordance with other embodiments, the major sides 108 and 110 are curved. The first major side 108 can alternatively be referred to as the front-side 108, and the second major side 110 can alternatively be referred to as the back-side 110. The peripheral sides 109a, 109b, 109c and 109d can be referred to individually as a peripheral side 109, or collectively as the peripheral sides 109. As the term "bulk" is used herein, a substrate is considered to be "bulk" substrate where the thickness of the substrate (between its major sides) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major sides) is at least 6200 nm, i.e., at least 6.2 µm. In accordance with certain embodiments, the bulk-substrate 106 has a thickness of at least 25 µm between its major sides 108 and 110. In specific embodiments, the bulk-substrate 106 has a thickness (between its major sides) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 10 is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 10, the input-coupler 112, the intermediate-component 114 and the output-coupler 116 are all shown as being provided in or on a same side (i.e., the back-side 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major sides 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major sides 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side 108 of the waveguide 108, another one of the components 112, 114 and 116 is provided in or on the back-side 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major sides 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index (also known as the index of refraction), line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. Each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major sides 108 or 110 of the bulk-substrate 106. In such embodiments, the SRG can be said to be formed "in" the bulk-substrate 106. Alternatively, each SRG can be physically formed in a coating that covers one of the major sides 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

More generally, the input-coupler 112, the intermediate-component 114 and the output-coupler 116 can have various different outer peripheral geometries, can be provided in or on either of the major sides of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 116, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

Figure 2:
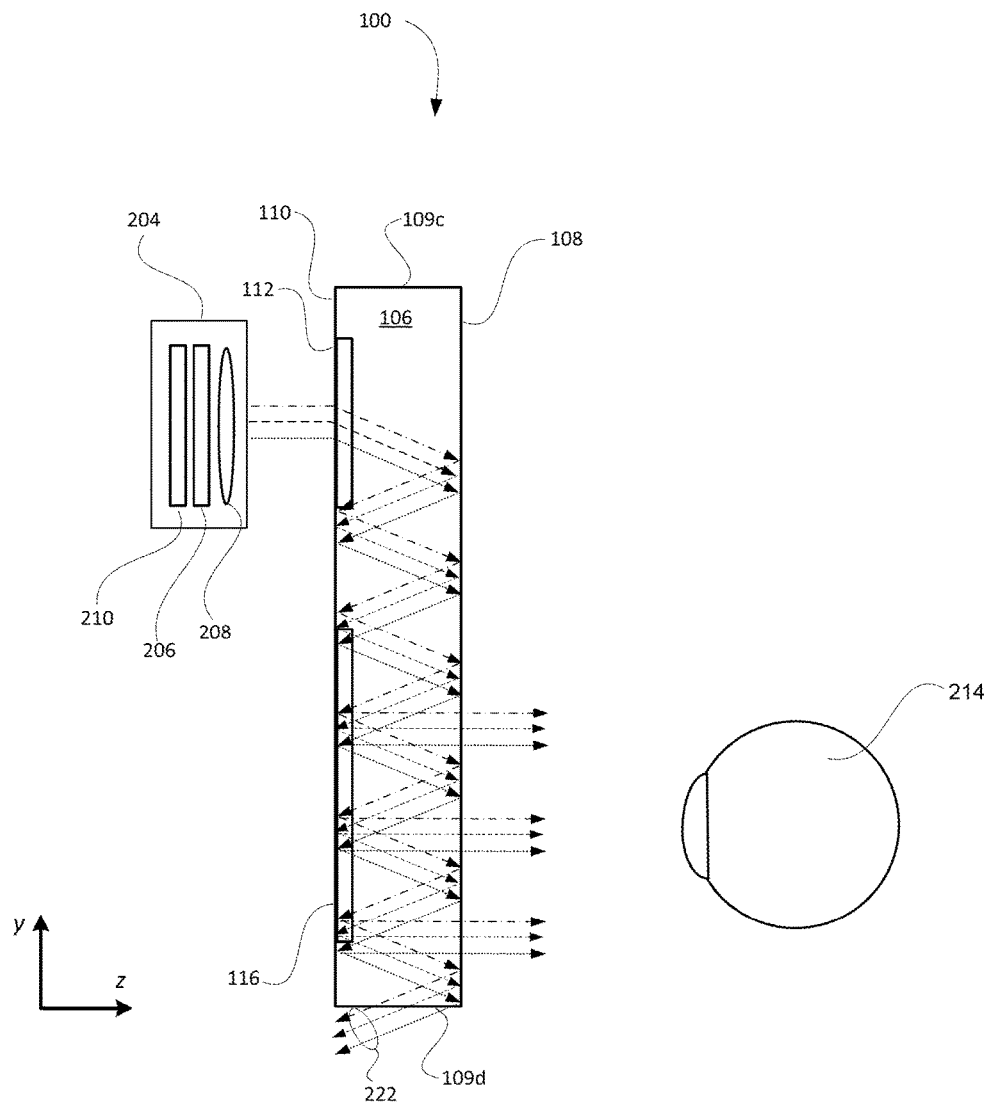
FIG. 2 is side view of the exemplary waveguide introduced with reference to FIGS. 1A, 1B and 1C, and also shows a display engine that generates an image including angular content that is coupled into the waveguide by the input-coupler, and also shows an eye that is viewing the image within an eye box that is proximate the output-coupler.

The concept of light traveling through the waveguide 100, from the input-coupler 112 to the output-coupler 116, by way of TIR, can be better appreciated from FIG. 2, which is discussed below. Referring now to FIG. 2, as in FIG. 10, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol™ display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin™ and Microoled™ provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto.

In FIG. 2, the display engine 204 is shown as facing the back-side 110 of the waveguide 100, and the eye 214 is shown as facing the front-side 108 opposite and parallel to the back-side 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major side (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

As shown in FIG. 2, light that is coupled into the waveguide 100 by the input-coupler 112, can travel by way of TIR from the input-coupler 112 to the intermediate-component 114, and by way of TIR from the intermediate-component 114 to the output-coupler 116, where it exits the waveguide 100. More specifically, a combination of diffractive beam splitting and TIR within the waveguide 100 results in multiple versions of an input beam of light being outwardly diffracted from the output-coupler 116 in both the length and the width of the output-coupler 116.

As also shown in FIG. 2, some light that is coupled into the waveguide 100, after traveling in a propagation direction towards the output-coupler 116 (e.g., generally from the peripheral side 109c towards the peripheral side 109d) may not be coupled out of the waveguide 100 by the output-coupler 116, and thus, may reach the peripheral side 109d and eventually leak out of the waveguide 100 through the peripheral side 109d. This may degrade the optical efficiency of the waveguide 100 and may cause undesirable stray light in a system that includes the waveguide 100. Similarly, light may undesirably leak out one or more of the other peripheral sides 109a, 109b and/or 109c. The optical efficiency of a waveguide, as the term is used herein, refers to the amount of light that is coupled into the waveguide through an input-coupler of the waveguide divided by the amount of light that is coupled out of the waveguide through an output-coupler of the waveguide.

In FIG. 2, the portion of the light that leaks out through the peripheral side 109d is labelled 222. In FIG. 2, the light 222 that leaks out of the peripheral side 109d is shown as continuing with a same angle that the light had when it was incident on the peripheral side, but this angle would likely actually be altered due to differences between the index of refraction of the bulk substrate 106 of the waveguide and the air or other medium adjacent to the peripheral side 109d.

Figure 3:
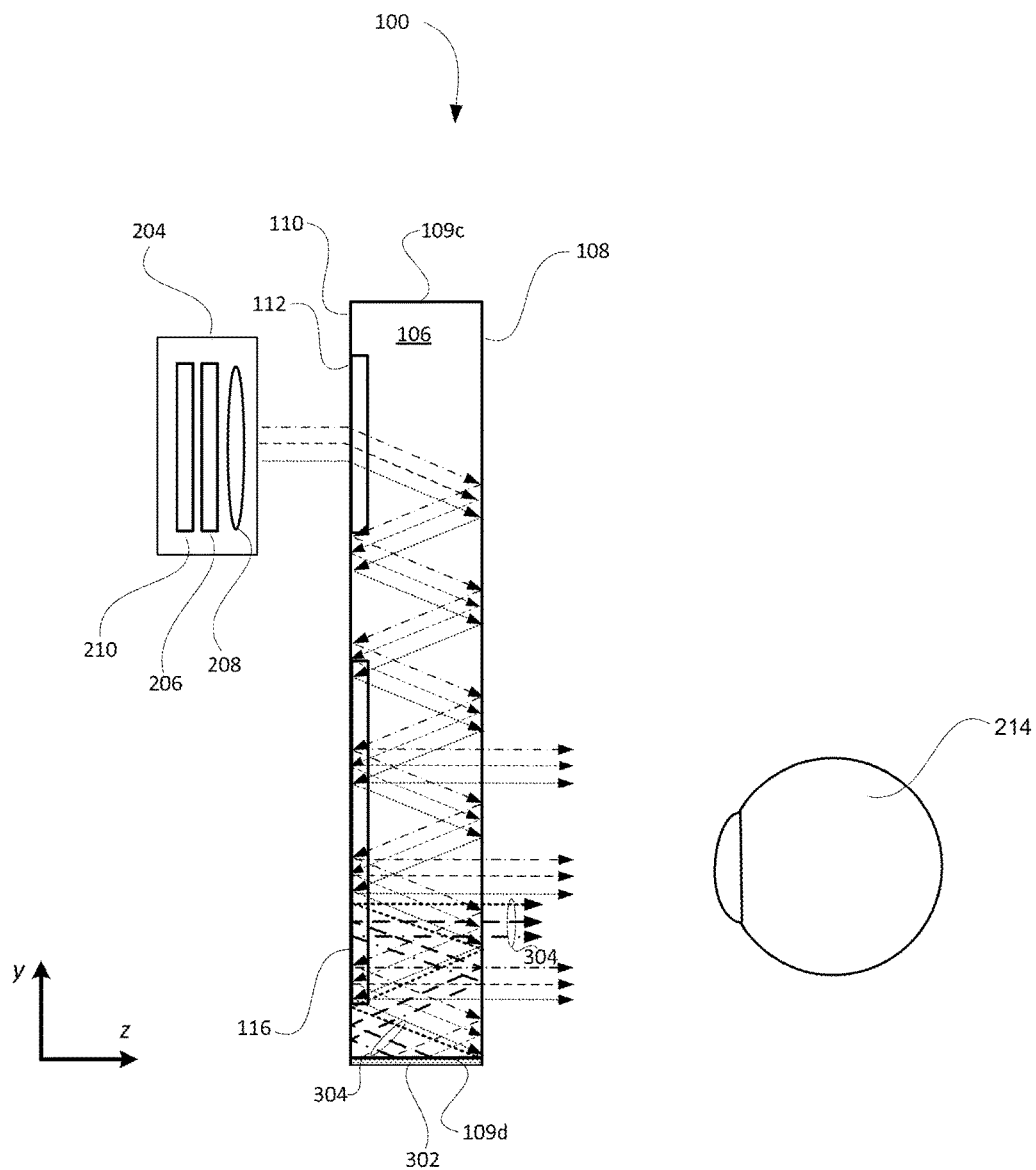
FIG. 3 is a side view that is similar to FIG. 2, but shows one of the peripheral sides, which is precisely 90 degrees relative to the first and second major sides, being coated with a reflective coating.

One technique to improve the optical efficiency of the waveguide 100 is to coat one or more of the peripheral sides 109 with a reflective material, as shown in FIG. 3. More specifically, in FIG. 3, the peripheral side 109d is shown as being coated with a reflective material 302, which can also be referred to as a reflective coating 302. Exemplary materials that may be used as the reflective coating include, but are not limited to, aluminium, gold, silver, a gold-alloy or a silver-alloy, or a dielectric material such as magnesium fluoride, or a combination thereof. The reflective coating 302 will cause light traveling within the waveguide 100 that reaches the peripheral side 109d (that is coated with the reflective coating 302) to be reflected off of the peripheral side 109d in the opposite direction. Rays of light that are reflected off the reflectively coated peripheral side 109d, which are shown in slightly thicker lines and are labelled 304, can be referred to as recycled light. If the reflectively coated peripheral side 109d is precisely 90 degrees relative to the major sides 108 and 110, then the recycled light will have the same angle of incidence relative to the major sides 108 and 110 that the light had when it was incident on the reflectively coated peripheral side 109d. A problem is that if the reflectively coated completely planar peripheral side 109d is not precisely 90 degrees relative to the major sides 108 and 110, then ghost images may result, as will be explained in more detail with reference to FIG. 4. Due to manufacturing tolerances, it is very difficult to manufacture a peripheral side 109 such that it is precisely 90 degrees relative to the major sides 108 and 110. The adverse effects of a peripheral side 109 not being precisely 90 degrees relative to the major sides 108 and 110 will now be described with reference to FIG. 4.

Figure 4:
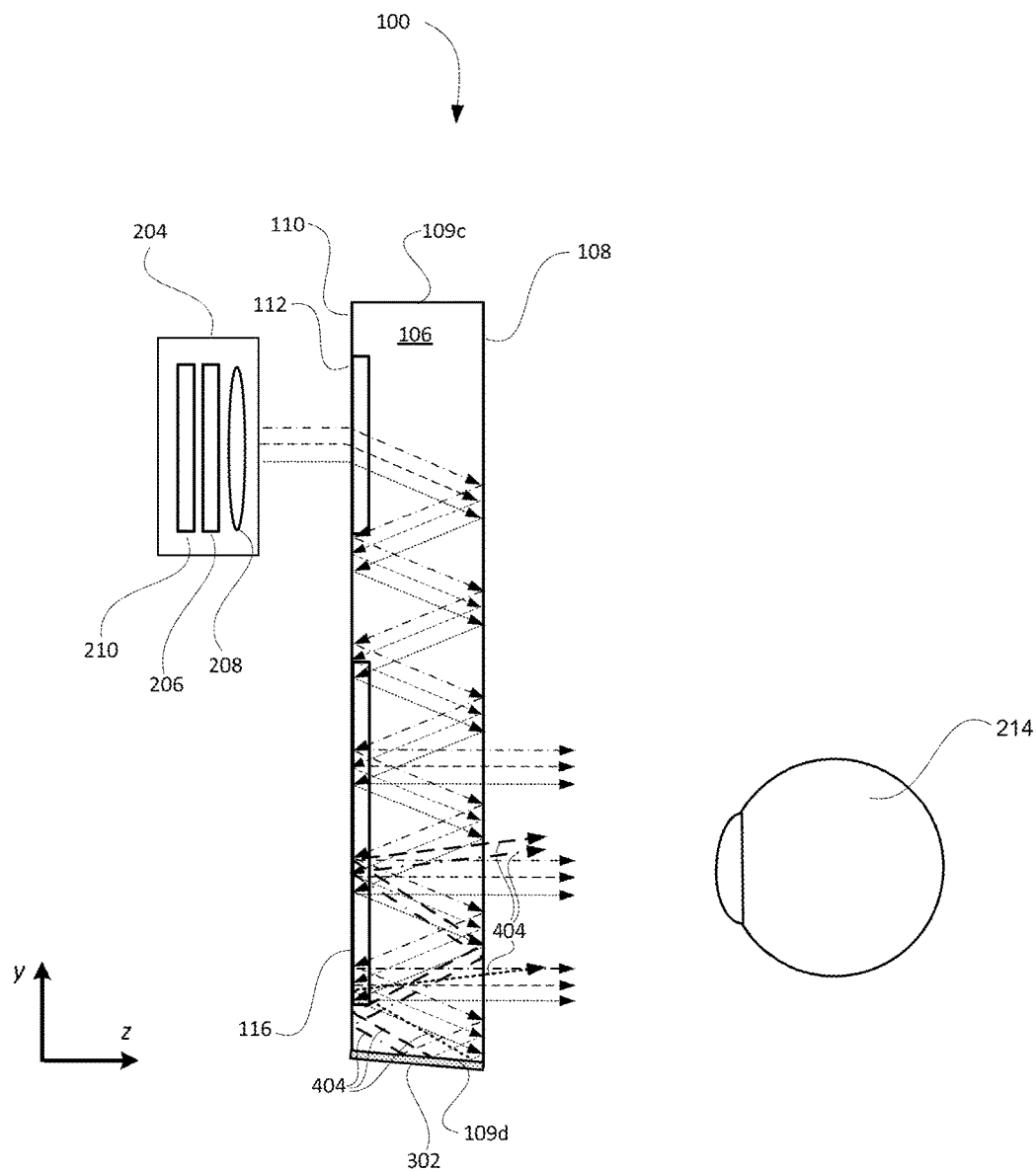
FIG. 4 is a side view that is similar to FIGS. 2 and 3, but shows one of the peripheral sides, which is not precisely 90 degrees relative to the first and second major sides, being coated with a reflective coating.

In FIG. 4 the peripheral side 109d, which is shown as not being precisely 90 degrees relative to the major sides 108 and 110, is coated with the reflective coating 302. The reflective coating 302 will cause light traveling within the waveguide 100 that reaches the peripheral side 109d (that is coated with the reflective coating 302) to be reflected off of the peripheral side 109d in the opposite direction. Rays of light that are reflected off the reflectively coated peripheral side 109d, which are shown in slightly thicker lines and are labelled 404, can be referred to as recycled light. As shown in FIG. 4, since reflectively coated peripheral side 109d is not precisely 90 degrees relative to the major sides 108 and 110, then the recycled light 404 will have a different angle of incidence relative to the major sides 108 and 110 than the light had when it was incident on the reflectively coated peripheral side 109d. This will result in the recycled light being diffracted out of the output-coupler 116 at a different angle than the light would have been diffracted out of the output-coupler 116 prior to being incident on the reflectively coated peripheral side 109d. This will result in an undesirable ghost image of a virtual image presented to a user's eye by the optical waveguide. Such a ghost image is essentially a replica of the desired virtual image that is offset in position and super imposed on top of the desired virtual image. Certain embodiments of the present technology, which are described below, effectively recycle light without causing such ghost images.

Figure 5:
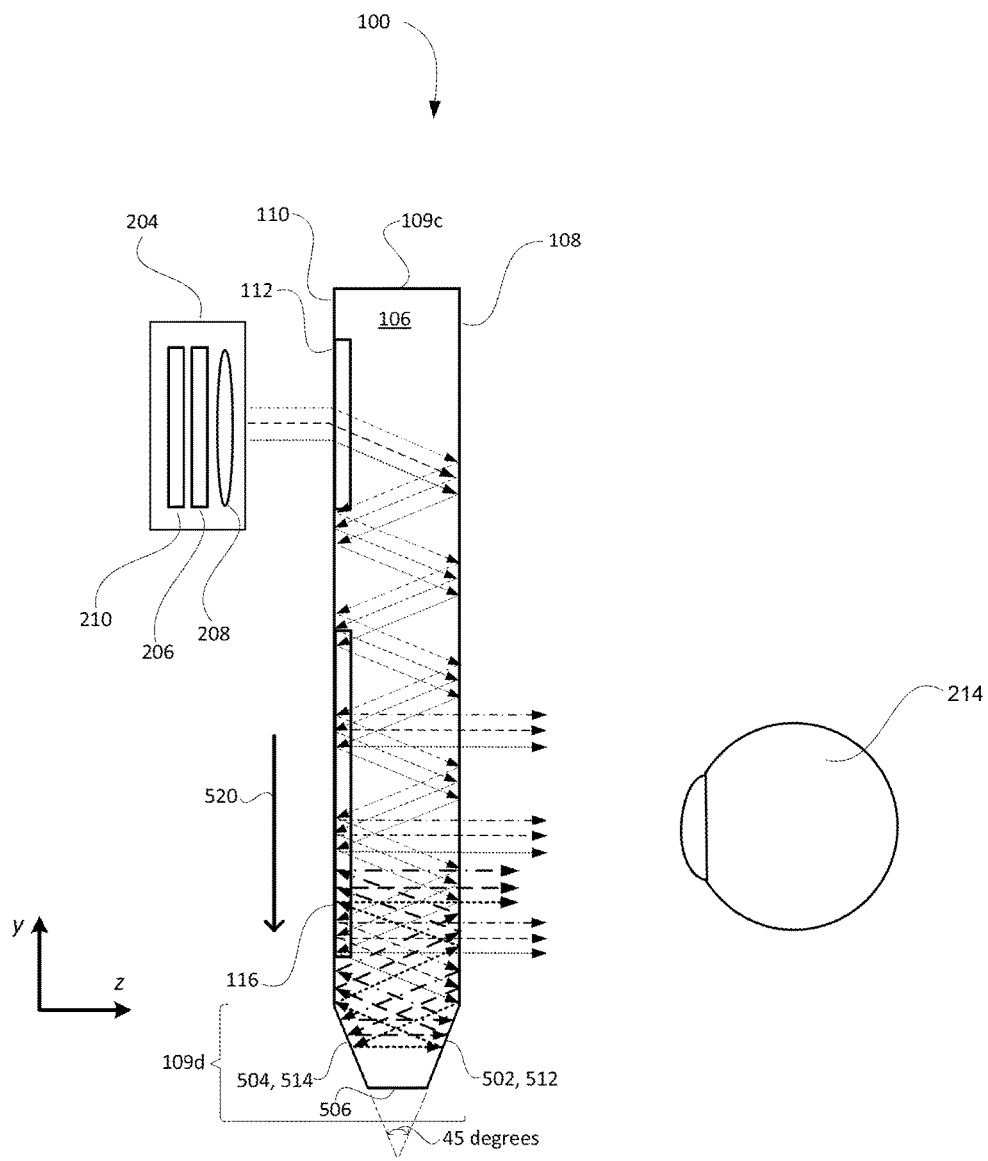
FIG. 5 is a side view of a waveguide including a peripheral side having a geometry that effectively recycles light, according to an embodiment of the present technology.

FIG. 5 is a side view of a waveguide 100 including a peripheral side 109d having a geometry that effectively recycles light, according to an embodiment of the present technology. Referring to FIG. 5, the peripheral side 109d is shown as including surfaces 502 and 504 that define first and second planes 512 and 514 which are angled 45 degrees relative to one another. The peripheral side 109d (which includes the surfaces 502 and 504 that define first and second planes 512 and 514 angled 45 degrees relative to one another) is configured to recycle light (corresponding to an image) that is incident on the peripheral side 109d after traveling within the bulk-substrate 106 of the optical waveguide 100 in a propagation direction toward the peripheral side 109d. More specifically, when light is incident on one of the surfaces 502 or 504 (after traveling within the bulk-substrate 106 of the optical waveguide 100 at an angle of incidence relative to the first and second major sides 108 and 110 in a propagation direction 520 toward the peripheral side 109d), that light is reflected toward the other one of the surfaces 502 or 504 of the peripheral side 109d, and then reflected therefrom in a direction opposite the propagation direction 520 with the same angle of incidence relative to the first and second major sides.

In FIG. 5, the peripheral side 109d is also shown as including a surface 506 that extends between the surfaces 502 and 504. Accordingly, in FIG. 5 edges between the peripheral side 109d and the first and second major planar sides 108 and 110 are chamfered edges. In an alternative embodiment, the surfaces 502 and 504 of the peripheral side 109d meet one another at a 45 degree angle, and thus, there is no surface 506. In such an alternative embodiment, the edges between the peripheral side and the first and second major planar sides are bevelled edges.

In accordance with an embodiment, the surface 502 is a planar surface that is coextensive with the first plane 512, and the surface 504 is a planar surface that is coextensive with the second plane 514. In other words, in such an embodiment the surface 502 and the first plane 512 are equivalent to one another, and the surface 504 and the second plane 514 are equivalent to one another.

In FIG. 5, the propagation direction 520 of light traveling towards the peripheral side 109d is shown as being the negative y direction. Such light can travel completely within a same y-z plane (parallel to the page), in which case light that is recycled by the peripheral side 109d and thereby travels in the direction opposite to the propagation direction 520 will also travel completely within the same y-z plane (parallel to the page). In other words, if light traveling in the propagation direction 520 travels at zero degrees relative to the y-z plane, then light that is recycled by the peripheral side 109d and thereby travels in the direction opposite to the propagation direction 520 will also travel at zero degrees relative to the y-z plane. However, it is more likely that light traveling in the propagation direction 520 towards the peripheral side 109d would also travel at some angle relative to a y-z plane, and thus, have an x component.

Assuming light traveling in the propagation direction 520 towards the peripheral side 109d travels at some angle relative to a y-z plane (and thus, has an x component), if the surface 502 is a planar surface that is coextensive with the first plane 512, and the surface 504 is a planar surface that is coextensive with the second plane 514, then the light that is recycled by the peripheral side 109d will travel in the direction opposite the propagation direction 520 at an angle relative to the y-z plane that is reversed in sign (compared to the light that travelled in the propagation direction 520). In other words, the sign of the angle of the recycled light in the orthogonal plane (the x-y plane in this example) would be reversed. For an example, if the x component of light traveling in the propagation direction 520 were plus 7 degrees, then the x component of the recycled light would be minus 7 degrees (if the surface 502 is a planar surface that is coextensive with the first plane 512, and the surface 504 is a planar surface that is coextensive with the second plane 514). This offset in the angle of the recycled light may cause undesirable ghost images.

In accordance with specific embodiments of the present technology, in order to preserve the sign of the angle (of the recycled light) in the orthogonal plane, one of the surfaces 502 and 504 is implemented as a multifaceted surface that includes a plurality of peaks and a plurality of valleys, while the other one of the surface 502 and 504 is implemented as a planar surface. More specifically, each of the peaks of the multifaceted surface is formed by a pair of adjacent facets that are 90 degrees relative to one another, each of the valleys of the multifaceted surface is formed by a pair of adjacent facets that are 90 degrees relative to one another, and the peaks collectively define the plane (512 or 514) of the multifaceted surface. Each pair of adjacent facets (of the multifaceted surface) that are 90 degrees relative to one another function in a similar manner as the roof section of a roof pentaprism. Additional details of such embodiments can be appreciated from FIG. 7, which is described below.

Figure 6:
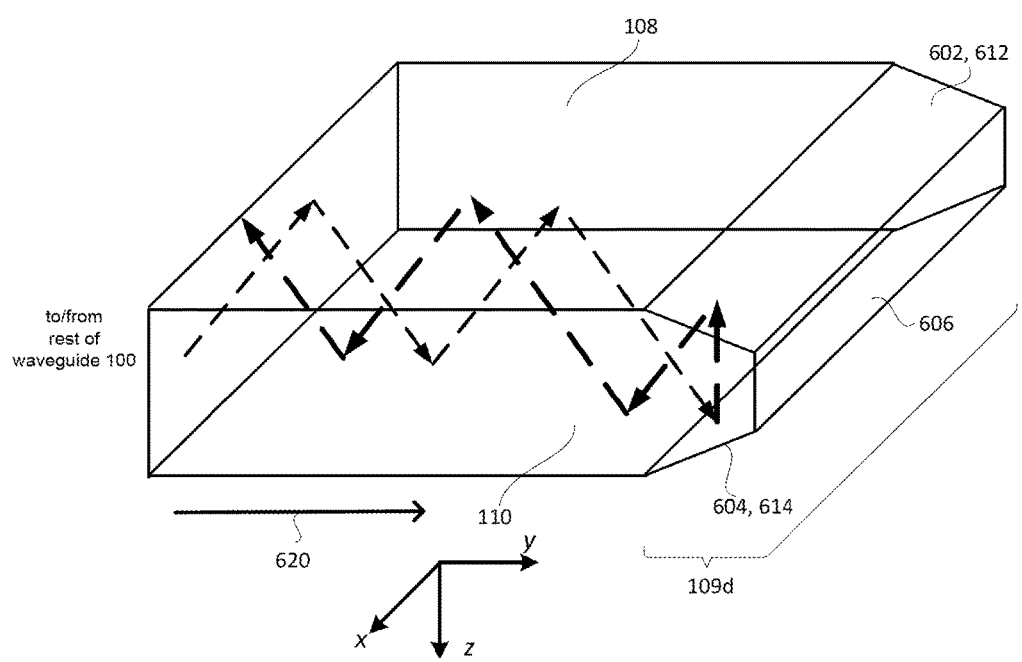
FIG. 6 is a perspective view of a portion of a waveguide that has a peripheral side having a geometry that effectively recycles light, according to an embodiment of the present technology, and more specifically the peripheral side include a first surface that is planar and coextensive with a first plane, a second surface that is planar and coextensive with a second plane, and a third surface that extends between the first and second surfaces, wherein the first and second planes are 45 degrees relative to one another.

FIG. 6 is a perspective view of a portion of a waveguide 100 that has a peripheral side 109d including a surface 602 that is planar and coextensive with a first plane 612, a surface 604 that is planar and coextensive with a second plane 614, and a surface 606 that extends between the surfaces 602 and 604, wherein the first and second planes 612 and 614 are 45 degrees relative to one another. While not specifically shown in FIG. 6, the waveguide 100 includes an input-coupler 112 and an output-coupler 116, and may also include an intermediate-component 114, each of which function in the manners described above with reference to FIGS. 1A, 1B, 10 and 2. As explained above, with the configuration of FIG. 6, the light that is recycled by the peripheral side 109d will travel in the direction opposite a propagation direction 620 at an angle relative to the y-z plane that is reversed in sign (compared to the light that travelled in the propagation direction 620). In other words, the sign of the angle of the recycled light in the orthogonal plane (the x-y plane in this example) would be reversed. For an example, if the x component of light traveling in the propagation direction 620 were plus 7 degrees, then the x component of the recycled light would be minus 7 degrees, which may cause undesirable ghost images.

In accordance with certain embodiments, the surfaces 602 and 604 are coated with a reflective coating, examples of which were described above with reference to the reflective coating 302 described with reference to FIGS. 3 and 4. In accordance with alternative embodiments, if the waveguide 100 can be designed such that substantially all of the light (after traveling within the waveguide) that is incident on the peripheral side 109d will experience TI R, then the surfaces 602 and 604 need not be coated with a reflective coating.

Figure 7A:
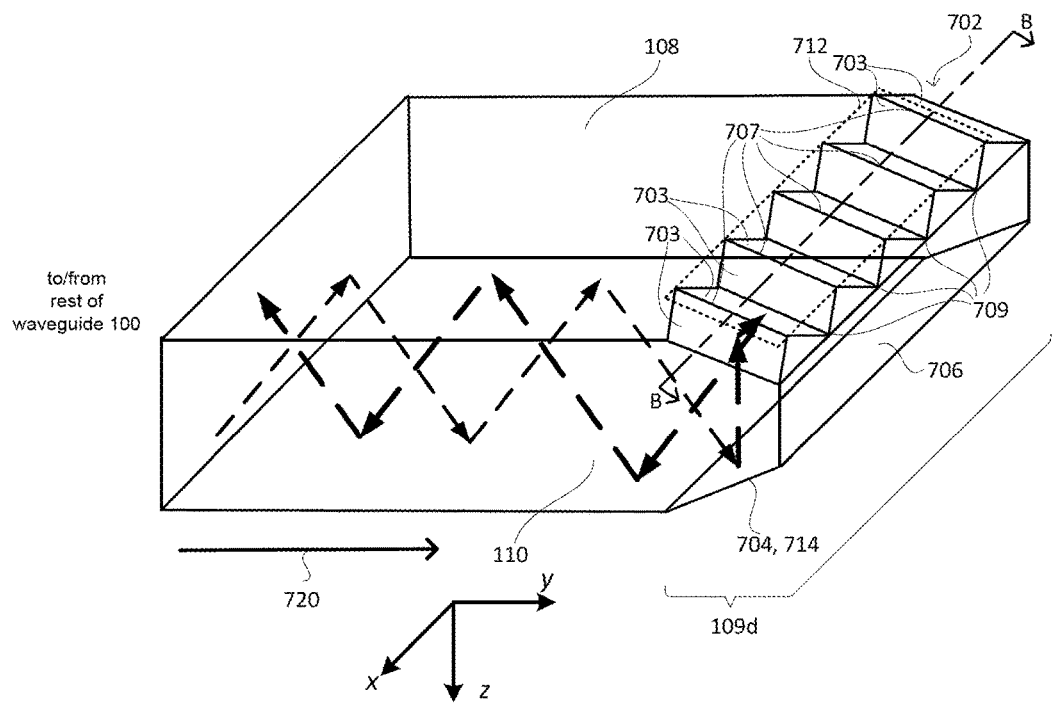
FIG. 7A is a perspective view of a portion of a waveguide that has a peripheral side having a geometry that effectively recycles light, according to another embodiment of the present technology, and more specifically the peripheral side include a first surface that is multifaceted and defines a first plane, a second surface that is planar and coextensive with a second plane, and a third surface that extends between the first and second surfaces, wherein the first and second planes are 45 degrees relative to one another.
Figure 7B:
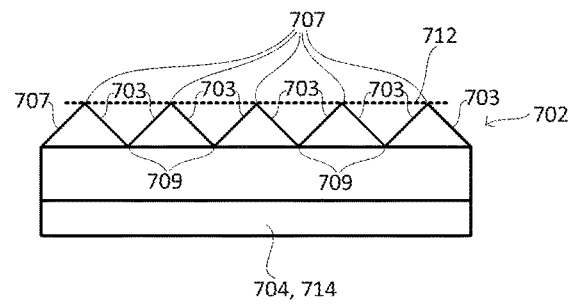
FIG. 7B is a cross-section view of the waveguide shown in FIG. 7A, along the line B-B in FIG. 7A.

FIG. 7A is a perspective view of a portion of a waveguide 100 that has a peripheral side 109d including a multifaceted surface 702 and a planar surface 704. FIG. 7B is a cross-section view of the waveguide 100 shown in FIG. 7A, along the line B-B in FIG. 7A. While not specifically shown in FIG. 7, the waveguide 100 includes an input-coupler 112 and an output-coupler 116, and may also include an intermediate-component 114, each of which function in the manners described above with reference to FIGS. 1A, 1B, 10 and 2. Referring to FIGS. 7A and 7B, the multifaceted surface 702 includes a plurality of peaks 707 that collectively define a first plane 712. The planar surface 704 is coextensive with and thereby defines a second plane 714. The first and second planes 712 and 714 are 45 degrees relative to one another. Each of the peaks 707 of the multifaceted surface 702 is formed by a pair of adjacent facets 703 that are 90 degrees relative to one another. The multifaceted surface 702 also includes a plurality of valleys 709 each of which is formed by a pair of adjacent facets 703 that are 90 degrees relative to one another. As explained above, with the configuration of FIG. 7, the sign of the angle of the recycled light in the orthogonal plane (the x-y plane in this example) is maintained. For an example, if the x component of light traveling in the propagation direction 720 were plus 7 degrees, then the x component of the recycled light would also be plus 7 degrees. More specifically, when light is incident on one of the facets 703 of the multifaceted surface 702, that light will be directed toward an adjacent one of the facets 703 (wherein the two facets are 90 degrees relative to one another and meet for form a peak 707) before being reflected away from the multifaceted surface 702. This is what preserves the sign of the angle of the recycled light in the orthogonal plane (the x-y plane in this example).

In accordance with certain embodiments, the surfaces 702 and 704 are coated with a reflective coating, examples of which were described above with reference to the reflective coating 302 described with reference to FIGS. 3 and 4. In accordance with alternative embodiments, if the waveguide 100 can be designed such that substantially all of the light (while traveling within the waveguide) that is incident on the peripheral side 109d will experience TIR, then the surfaces 702 and 704 need not be coated with a reflective coating.

In FIGS. 7A and 7B, the surface 702 was shown as being multifaceted and the surface 704 was shown as being planar. Alternatively, the surface 702 can be planar and the surface 704 can be multifaceted, and the peripheral side 109d would similarly effectively recycle light in a manner that maintains the sign of the angle of the recycled light in the orthogonal plane (the x-y plane in this example).

The peripheral side geometries shown in and described with reference to FIGS. 5, 6, 7A and 7B decouple alignment errors between the major sides 108 and 110 and the peripheral side 109d. It is relatively easy to manufacture a waveguide 100 having first and second major sides 108 and 110 that are parallel to one another. It is also relative easy to manufacture a peripheral side 109 having a pair of surfaces (e.g., 502 and 504, 602 and 604, or 702 and 704) that define first and second planes (e.g., 512 and 514, or 612 and 614, or 712 and 714) that are angled 45 degrees relative to one another. However, as noted above, with reference to FIGS. 3 and 4, it is very difficult to manufacture a peripheral side 109 that is precisely 90 degrees relative to the first and second major sides 108 and 110, which makes adding a reflective coating to a completely planar peripheral side 109 impractical. The embodiments of the present technology that were described above with reference to FIGS. 5, 6, 7A and 7B overcome this problem by utilizing a peripheral side geometry that is not sensitive to alignment relative to the major sides 108 and 110 of the waveguide 100. In other words, so long as a peripheral side 109 includes a pair of surfaces (e.g., 502 and 504, 602 and 604, or 702 and 704) that define first and second planes (e.g., 512 and 514, or 612 and 614, or 712 and 714) that are angled 45 degrees relative to one another, the angles of portions of the peripheral side 109 relative to the major sides 108 and 110 are not critical.

Further, it is noted that it is relatively easy to manufacture a peripheral side 109 that includes a pair of surfaces (e.g., 502 and 504, 602 and 604, or 702 and 704) that define first and second planes (e.g., 512 and 514, or 612 and 614, or 712 and 714) that are angled 45 degrees relative to one another. For example, one or more high precision bevel tools can be used to create the chamfered or bevelled geometries described herein. Alternatively, a waveguide with one or more peripheral sides having one of the desired geometries described herein can be produced using a mold. The use of other manufacturing techniques are also possible and within the scope of the embodiments of the present technology.

In FIGS. 5, 6, 7A and 7B, the peripheral side 109d was described as having the geometry where a pair of surfaces (e.g., 502 and 504, 602 and 604, or 702 and 704) that define first and second planes (e.g., 512 and 514, or 612 and 614, or 712 and 714) are angled 45 degrees relative to one another. Alternatively, or additionally, one or more of the other peripheral sides (e.g., 109a, 109b and/or 109c) of an optical waveguide 100 may have the same geometry that provides for effective recycling of light that while traveling within the waveguide is incident thereon. Utilizing this peripheral side geometry on additional peripheral sides 109 should further increase the optical efficiency of the waveguide. As noted above, the optical efficiency of a waveguide, as the term is used herein, refers to the amount of light that is coupled into the waveguide through an input-coupler of the waveguide divided by the amount of light that is coupled out of the waveguide through an output-coupler of the waveguide.

Instead manufacturing a peripheral side 109 having a pair of surfaces that define first and second planes that are 45 degrees relative to one another, an alternative option would be manufacture a peripheral side 109 having a pair of planar surfaces that are 90 degrees relative to one another. For example, referring to FIG. 5, instead of having the planar surfaces 602 and 604 (of the peripheral side 109d) be 45 degrees relative to one another, the planar surfaces 602 and 604 can instead be 90 degrees relative to one another, and the side 606 can be eliminated so that the planar surfaces meet at a 90 degree angle. Such an alternative is believed to be inferior to the embodiments of the present technology described herein (where a peripheral side includes first and second surfaces that define first and second planes angled 45 degrees relative to one another). This is because for a given thickness of the bulk substrate 106 of the waveguide 100, the 45 degree arrangement allows for a larger aperture for recycling light without causing ghost images than the 90 degree arrangement. Additionally, the 90 degree arrangement will only recycle light rays without causing ghost images if the light rays are incident on a surface of the peripheral side after traveling within the waveguide by way of TIR at an angle (relative to the normal to the major sides of the waveguide) that is greater than 45 degrees. This is because such light rays would only reflect off one of the two surfaces (of the peripheral side) that are at 90 degrees relative to one another. In contrast, the 45 degree arrangement will recycle light rays without causing ghost images even where the light rays are incident on a surface of the peripheral side after traveling within the waveguide by way of TIR at an angle (relative to the normal to the major sides of the waveguide) that is less than 45 degrees.

While not specifically shown in all of the above described figures, each of the optical waveguides described herein can be for use with a display engine, which can be the same as or similar to the display engine 204 described above with reference to FIG. 2, but is not limited thereto. For example, the display engine (e.g., 204) can face a back-side of one of the optical waveguide(s), and a user's eye (e.g., the eye of a person wearing HMD glasses) can facing a front-side opposite and parallel to the back-side, to provide for a periscope type of configuration in which light enters the waveguide on one side of the waveguide, and exits the waveguide at an opposite side of the waveguide. Alternatively, the input-coupler and the output-coupler can be implemented in a manner such that the display engine and a user's eye are proximate to and face a same major side of the optical waveguide.

The optical waveguides described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different colors (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

Figure 8:
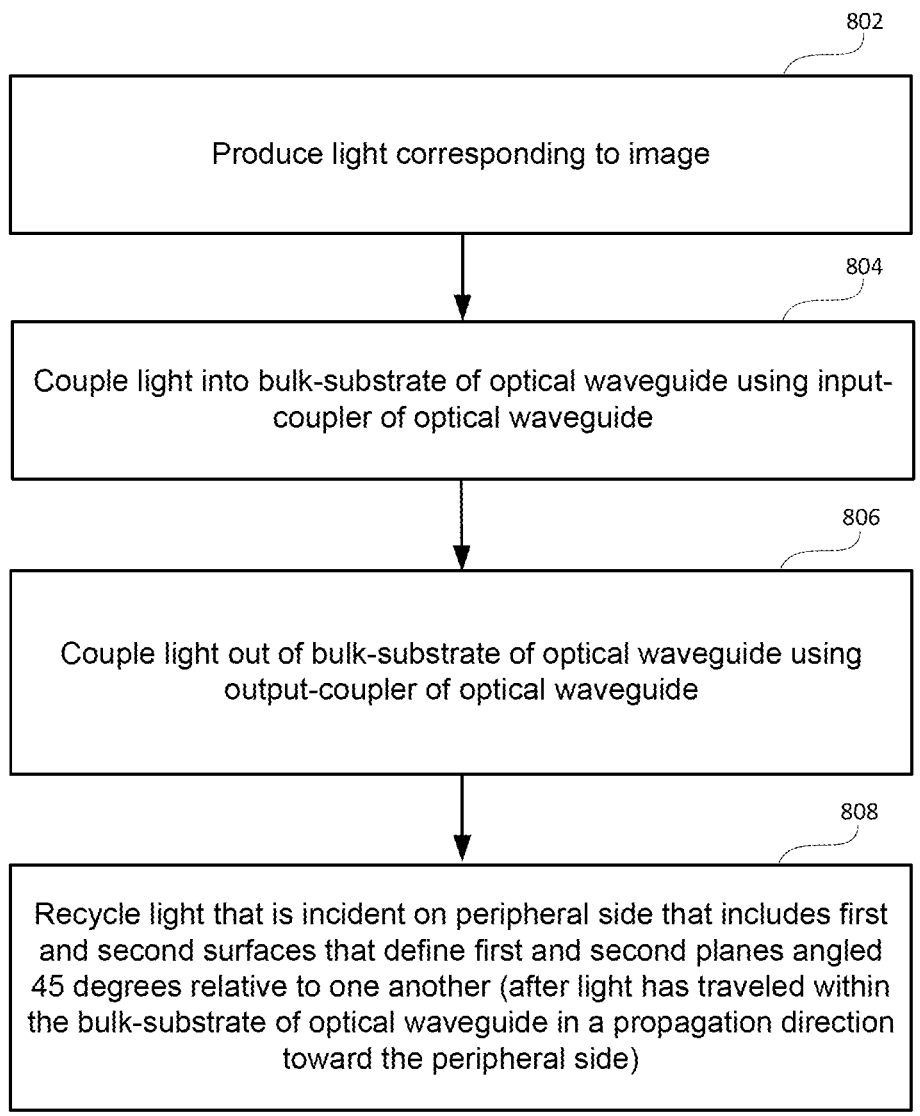
FIG. 8 is a high level flow diagram that is used to summarize methods according to certain embodiments of the present technology.

FIG. 8 is a high level flow diagram that is used to summarize methods according to certain embodiments of the present technology. Such methods, which can be for use with a near-eye or heads-up display system including an optical waveguide, can use the optical waveguide to replicate an image associated with an input-pupil to an output-pupil. Such an optical waveguide includes at least an input-coupler and an output-coupler, and may also include an intermediate-component Referring to FIG. 8, step 802 involves producing light corresponding to an image, and step 804 involves coupling the light corresponding to the image into an optical waveguide. More specifically, step 804 can involve coupling light corresponding to an image associated with an input-pupil into a bulk-substrate of an optical waveguide. In accordance with an embodiment, step 802 is performed using a display engine, which can be the same as or similar to the display engine 204 described above with reference to FIG. 2, but is not limited thereto. In accordance with an embodiment, the coupling of the light corresponding to the image into optical waveguide at step 804 is performed using an input-coupler (e.g., 112) of the optical waveguide (e.g. 100).

Still referring to FIG. 8, step 806 involves coupling out of the bulk-substrate of the optical waveguide, light corresponding to the image that has traveled through the optical waveguide from the input-coupler to the output-coupler at least in part by way of total internal reflection (TIR). In accordance with an embodiment, step 804 is performed using an output-coupler (e.g., 116) of the optical waveguide (e.g., 100).

Step 808 involves recycling at least a portion (and preferably all) of the light corresponding to the image, that is incident on one of the peripheral sides that includes first and second surfaces that define first and second planes angled 45 degrees relative to one another (after the portion of the light corresponding to the image has traveled within the bulk-substrate of the optical waveguide in a propagation direction toward the one of the peripheral sides). The recycling of light that is performed at step 808 is performed using the first and second surfaces that define the first and second planes angled 45 degrees relative to one another. Exemplary details of such surfaces and planes were described above with reference to FIGS. 5, 6, 7A and 7B. For example, referring back to FIG. 5, step 808 can involve using one of the surfaces 502 or 504 to reflect, towards the other one of the surfaces 502 or 504, a portion of the light corresponding to an image that after being coupled into the waveguide 100 is incident on one of the surfaces 502 or 504. Such light may be incident on one of the surfaces 502 or 504 after traveling within the bulk-substrate 106 of the optical waveguide 100 at an angle of incidence relative to first and second major sides 108 and 110 in a propagation direction 520 toward the peripheral side 109*d*. Step 808 can also involve using the other one of the surfaces 502 or 504 to reflect the portion of the light corresponding to the image incident therein in a direction opposite the propagation direction 520 with the same angle of incidence relative to the first and second major sides 108 and 110.

As was explained above with reference to FIGS. 5 and 6, both of the surfaces (e.g., 502 and 504, or 602 and 604) can be planar surfaces that are coextensive with and define first and second planes (e.g., 512 and 514, or 612 and 614). Alternatively, as was explained above with reference to FIGS. 5, 7A and 7B, one of the surfaces (e.g., 502 or 702) can be a multifaceted surface 702, and the other one of the surfaces can be and a planar surface (e.g., 504 or 704). Such a multifaceted surface, as explained above, includes a plurality of peaks and a plurality of valleys, with each of the peaks formed by a pair of adjacent facets of the multifaceted surface that are 90 degrees relative to one another, and each of the valleys similarly formed by a pair of adjacent facets of the multifaceted surface that are 90 degrees relative to one another. In such an embodiment, the peaks of the multifaceted surface collectively define one of the first and second planes, and the other one of the first and second surfaces is planar and defines the other one of the first and second planes. Use of the multifaceted surface preserves a sign, of the portion of the light corresponding to the image that is reflected in the direction opposite the propagation direction after being incident on the peripheral sides, in an orthogonal plane relative to the first and second major sides (e.g., 108 and 110) of the optical waveguide.

As noted above, the methods described with reference to FIG. 8 can be performed using an optical waveguide that includes at least an input-coupler and an output-coupler, and may also include an intermediate-component. Where the optical waveguide includes an input-coupler (e.g., 112) and an output-coupler (e.g., 116), but not an intermediate-component (e.g., 114), the input-coupler will direct light that it couples into the optical waveguide toward the output-coupler, and the output-coupler may provide one of horizontal or vertical pupil expansion. Where the optical waveguide also includes an intermediate-component, then the input-coupler can be used to direct the light corresponding to the image (that is coupled into the bulk-substrate of the optical waveguide) toward the intermediate-component. The intermediate-component can be used to perform one of horizontal or vertical pupil expansion and to direct the light corresponding to the image towards the output-coupler, and the output-coupler can be used to perform the other one of horizontal or vertical pupil expansion. Additional details of the methods summarized with reference to FIG. 8 can be appreciated from the above discussion of FIGS. 1A, 1B, 1C, 2-6, 7A and 7B.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for use in replicating an image associated with an input-pupil to an output-pupil, the apparatus comprising:
    an optical waveguide including a bulk-substrate, an input-coupler and an output-coupler;
    the bulk-substrate of the optical waveguide including a first major side, a second major side opposite the first major side, and peripheral sides;
    the input-coupler of the optical waveguide configured to couple, into the bulk-substrate of the optical waveguide, light corresponding to the image associated with the input-pupil; and
    the output-coupler of the optical waveguide configured to couple, out of the bulk-substrate of the optical waveguide, light corresponding to the image that has traveled through the optical waveguide from the input-coupler to the output-coupler at least in part by way of total internal reflection (TIR),
    wherein a peripheral side of the peripheral sides of the bulk-substrate of the optical waveguide includes first and second surfaces that define first and second planes angled 45 degrees relative to one another, and
    wherein the first and second surfaces direct light incident on the first and second surfaces to the output-coupler for output in parallel with the light corresponding to the image.

2. The apparatus of claim 1, wherein the peripheral side is configured to recycle a portion of the light corresponding to the image that is incident on the first and second surfaces after traveling within the bulk-substrate of the optical waveguide in a propagation direction toward the peripheral side.

3. The apparatus of claim 1, wherein the peripheral sides is configured to cause a portion of the light corresponding to the image, that after being coupled into the waveguide is incident on one of the first and second surfaces after traveling within the bulk-substrate of the optical waveguide at an angle of incidence relative to the first and second major sides in a propagation direction toward the peripheral side, to be reflected toward the other one of the first and second surfaces of the peripheral side, and then be reflected from the other one of the first and second surface in a direction opposite the propagation direction with a same angle of incidence relative to the first and second major sides.

4. The apparatus of claim 1, wherein:
    the first surface comprises a multifaceted surface that includes a plurality of peaks and a plurality of valleys;
    each of the plurality of peaks is formed by a pair of adjacent facets of the multifaceted surface that are 90 degrees relative to one another;
    each of the plurality of valleys is formed by a pair of adjacent facets of the multifaceted surface that are 90 degrees relative to one another;
    the plurality of peaks collectively define the first plane; and
    the second surface is planar and defines the second plane.

5. The apparatus of claim 1, wherein the first and second surfaces are each planar, and the planar first and second surfaces respectively define the first and second planes that are 45 degrees relative to one another.

6. The apparatus of claim 1, wherein:
    the first surface defines a first chamfered or beveled edge that is between the peripheral side and the first major side; and
    the second surface defines a second chamfered or beveled edge that is between the peripheral side and the second planer.

7. The apparatus of claim 1, further comprising:
    chamfered edges between the peripheral side and the first and second major sides; and
    wherein the peripheral side also includes a third surface that extends between the first and second surfaces.

8. The apparatus of claim 1, further comprising:
    beveled edges between the peripheral side and the first and second major sides; and
    wherein the first and second surfaces of the peripheral side meet one another at a 45 degree angle.

9. The apparatus of claim 1, wherein:
    the optical waveguide also includes an intermediate-component;
    the input-coupler is configured to direct the light corresponding to the image associated with the input-pupil, which is coupled into the bulk-substrate of the waveguide, toward the intermediate-component;
    the intermediate-component is configured to perform one of horizontal or vertical pupil expansion and to direct the light corresponding to the image towards the output-coupler; and
    the output-coupler is configured to perform the other one of horizontal or vertical pupil expansion.

10. A method for use within an optical waveguide including a bulk-substrate, an input-coupler and an output-coupler, the bulk-substrate of the optical waveguide including a first major side, a second major side opposite the first major side, and peripheral sides, the method comprising:
    coupling into the bulk-substrate of the optical waveguide, light corresponding to an image associated with an input-pupil, using the input-coupler of the optical waveguide;
    coupling out of the bulk-substrate of the optical waveguide, light corresponding to the image that has traveled through the optical waveguide from the input-coupler to the output-coupler at least in part by way of total internal reflection (TIR), using the output-coupler; and recycling a portion of the light corresponding to the image, that is incident on one of the peripheral sides that includes first and second surfaces that define first and second planes angled 45 degrees relative to one another, after the portion of the light corresponding to the image has traveled within the bulk-substrate of the optical waveguide in a propagation direction toward the one of the peripheral sides, the recycling performed using the first and second surfaces that define first and second planes angled 45 degrees relative to one another, wherein the first and second surfaces direct light incident on the first and second surfaces to the output-coupler for output in parallel with the light corresponding to the image.

11. The method of claim 10, wherein the recycling includes:

using one of the first and second surfaces to reflect, towards the other one of the first and second surfaces, a portion of the light corresponding to the image, that after being coupled into the waveguide is incident on the one of the first and second surfaces after traveling within the bulk-substrate of the optical waveguide at an angle of incidence relative to the first and second major sides in a propagation direction toward the one of the peripheral sides; and using the other one of the first and second surfaces, to reflect the portion of the light corresponding to the image incident therein in a direction opposite the propagation direction with a same angle of incidence relative to the first and second major sides.

12. The method of claim 11, wherein:

one of the first and second surfaces of the one of the peripheral sides comprises a multifaceted surface that includes a plurality of peaks and a plurality of valleys, each of the peaks is formed by a pair of adjacent facets of the multifaceted surface that are 90 degrees relative to one another, each of the valleys is formed by a pair of adjacent facets of the multifaceted surface that are 90 degrees relative to one another, the peaks collectively define the one of the first and second planes, and the other one of the first and second surfaces is planar and defines the other one of the first and second planes: and the recycling includes using the multifaceted surface to preserve a sign, in an orthogonal plane relative to the first and second major sides, of the portion of the light corresponding to the image that is reflected in the direction opposite the propagation direction after being incident on the one of the peripheral sides.

13. The method of claim 10, wherein the first and second surfaces of the one of the peripheral sides are each planar, and the planar first and second surfaces respectively define the first and second planes that are 45 degrees relative to one another.

14. The method of claim 10, wherein the optical waveguide also includes an intermediate-component, and further comprising:

using the input-coupler to direct the light corresponding to the image, the is coupled into the bulk-substrate of the optical waveguide, toward the intermediate-component; and using the intermediate-component to perform one of horizontal or vertical pupil expansion and to direct the light corresponding to the image towards the output-coupler; and using the output-coupler to perform the other one of horizontal or vertical pupil expansion.

15. A near-eye or heads-up display system, comprising:

an optical waveguide including a bulk-substrate, an input-coupler and an output-coupler;

a display engine configured to produce an image and to direct light corresponding to the image toward the input-coupler of the optical waveguide;

the bulk-substrate of the optical waveguide including a first major side, a second major side opposite the first major side, and peripheral sides;

the input-coupler of the optical waveguide configured to couple, into the bulk-substrate of the optical waveguide, light corresponding to the image; and the output-coupler of the optical waveguide configured to couple, out of the bulk-substrate of the optical waveguide, light corresponding to the image that has traveled through the optical waveguide from the input-coupler to the output-coupler at least in part by way of total internal reflection (TIR), wherein a peripheral side of the peripheral sides of the bulk-substrate of the optical waveguide includes first and second surfaces that define first and second planes angled 45 degrees relative to one another, and wherein the first and second surfaces direct light incident on the first and second surfaces to the output-coupler for output in parallel with the light corresponding to the image.

16. The display system of claim 15, wherein:

the first surface comprises a multifaceted surface that includes a plurality of peaks and a plurality of valleys;

each of the plurality of peaks is formed by a pair of adjacent facets of the multifaceted surface that are 90 degrees relative to one another;

each of the plurality of valleys is formed by a pair of adjacent facets of the multifaceted surface that are 90 degrees relative to one another;

the plurality of peaks collectively define the first plane; and the second surface is planar and defines the second plane.

17. The display system of claim 15, wherein the first and second surfaces are each planar, and the planar first and second surfaces respectively define the first and second planes that are 45 degrees relative to one another.

18. The display system of claim 15, wherein:

the optical waveguide also includes an intermediate-component;

the input-coupler is configured to direct the light corresponding to the image, which is coupled into the bulk-substrate of the waveguide, toward the intermediate-component;

the intermediate-component is configured to perform one of horizontal or vertical pupil expansion and to direct the light corresponding to the image towards the output-coupler; and the output-coupler is configured to perform the other one of horizontal or vertical pupil expansion.

19. The apparatus of claim 1, wherein the first and second surfaces are coated with a reflective material.

20. The method of claim 10, wherein the first and second surfaces are coated with a reflective material.

21. The display system of claim 15, wherein the first and second surfaces are coated with a reflective material.

* * * * *